United States Patent
Stooke et al.

(10) Patent No.: US 12,431,122 B2
(45) Date of Patent: Sep. 30, 2025

(54) TRAINING A LANGUAGE MODEL OF AN END-TO-END AUTOMATIC SPEECH RECOGNITION MODEL USING RANDOM ENCODER FEATURES

(71) Applicant: Google LLC, Mountain View, CA (US)

(72) Inventors: Adam Michael Stooke, San Francisco, CA (US); Khe Chai Sim, Dublin, CA (US); Mason Vijay Chua, Mountain View, CA (US)

(73) Assignee: Google LLC, Mountain View, CA (US)

( * ) Notice: Subject to any disclaimer, the term of this patent is extended or adjusted under 35 U.S.C. 154(b) by 379 days.

(21) Appl. No.: 18/065,692

(22) Filed: Dec. 14, 2022

(65) Prior Publication Data
US 2024/0203399 A1   Jun. 20, 2024

(51) Int. Cl.
*G10L 15/16* (2006.01)
*G10L 15/06* (2013.01)
*G10L 15/183* (2013.01)

(52) U.S. Cl.
CPC ............ *G10L 15/063* (2013.01); *G10L 15/16* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 11,423,312 B2* | 8/2022 | Choi | G06N 3/082 |
| 11,551,668 B1* | 1/2023 | Baevski | G06F 18/2155 |
| 12,087,306 B1* | 9/2024 | Le | G10L 15/28 |
| 12,159,617 B2* | 12/2024 | Chen | G10L 15/063 |
| 12,249,317 B2* | 3/2025 | Li | G06N 3/0495 |
| 12,249,336 B2* | 3/2025 | Li | G10L 15/16 |
| 2019/0108832 A1 | 4/2019 | Tomar et al. | |
| 2019/0279618 A1 | 9/2019 | Yadav et al. | |
| 2019/0349426 A1* | 11/2019 | Smith | H04L 9/3239 |
| 2021/0165976 A1* | 6/2021 | Lee | G06F 40/58 |
| 2021/0287430 A1* | 9/2021 | Li | G06T 7/74 |
| 2022/0310097 A1 | 9/2022 | Kim et al. | |
| 2023/0081171 A1* | 3/2023 | Zhang | G06T 11/00 382/157 |

(Continued)

OTHER PUBLICATIONS

Zhong Meng et al: "International Language Model Adaptation with Text-Only Data for End-to-End Speech Recognition", arvix.org, Cornell University Library, 201 Olin Liberary Cornell University Ithaca, NY 14853, Feb. 18, 2022 (Feb. 18, 2022), XP091156880.

(Continued)

*Primary Examiner* — Neeraj Sharma
(74) *Attorney, Agent, or Firm* — Honigman LLP; Brett A. Krueger; Grant Griffith

(57) ABSTRACT

A method includes obtaining a training text sample, the training text sample not paired with corresponding audio data, and generating a sequence of pseudo-random encoder variables. The method also includes processing, using a decoder of a sequence transduction model, the sequence of pseudo-random encoder variables to predict a probability distribution over possible output labels. The method further includes determining a loss based metric based on the training text sample and the predicted probability distribution over possible output labels, and training the decoder based on the loss metric.

20 Claims, 6 Drawing Sheets

(56) References Cited

U.S. PATENT DOCUMENTS

2023/0360646 A1* 11/2023 Coucheiro Limeres ..................... G10L 15/197
2024/0153508 A1* 5/2024 Moritz .................. G06F 40/169
2025/0094519 A1* 3/2025 Kol ..................... G06F 16/9566
2025/0166622 A1* 5/2025 Chhugani ............... G10L 15/26

OTHER PUBLICATIONS

Zheng Xianrui et al: "Using Synthetic Audio to Improve the Recognition of Out-of-Vocabulary Words in End-to-End Asr Systems", ICASSP 2021—2021 IEEE International Conference on Acoustics, Speech and Signal Processing (ICASSP), IEEE, Jun. 6, 2021 (Jun. 6, 2021), pp. 5674-5678, XP033955702.
Stooke Adam et al: "Internal Language Model Personalization of E2E Automatic Speech Recognition Using Random Encoder Features", 2022 IEEE Spoken Language Technology Workshop (SLT), IEEE, Jan. 9, 2023 (Jan. 9, 2023), pp. 213-220, XP034282907.
International Search Report and Written Opinion issued in related PCT Application No. PCT/US2023/080831 dated Feb. 16, 2024.

* cited by examiner

TRAINING A LANGUAGE MODEL OF AN END-TO-END AUTOMATIC SPEECH RECOGNITION MODEL USING RANDOM ENCODER FEATURES

TECHNICAL FIELD

This disclosure relates to training a language model of an end-to-end (E2E) automatic speech recognition (ASR) model.

BACKGROUND

Automatic speech recognition (ASR) systems provide a technology that is often used in mobile devices and other user devices. In general, ASR systems attempt to provide accurate transcriptions of what a user speaks to a device. Modern ASR systems focus on providing not only high quality (e.g., a low word error rate), but also low latency (e.g., a short delay between the user speaking and a transcription appearing) speech recognition for spoken utterances.

SUMMARY

One aspect of the disclosure provides a computer-implemented method for training a language model of a speech recognition model using random encoder features. The computer-implemented method, when executed on data processing hardware, causes the data processing hardware to perform operations including obtaining a training text sample, the training text sample not paired with corresponding audio data, and generating a sequence of pseudo-random encoder variables. The operations further include processing, using a decoder of a sequence transduction model, the sequence of pseudo-random encoder variables to predict a probability distribution over possible output labels, determining a loss metric based on the training text sample and the predicted probability distribution over possible output labels, and training the decoder based on the loss metric.

Implementations of the disclosure may include one or more of the following optional features. In some implementations, training the decoder based on the loss metric includes training the decoder based on a negative log of the probability distribution over possible output labels for the training text sample conditioned on the sequence of pseudo-random encoder variables. In some examples, the sequence transduction model is pre-trained on paired audio-text samples, and training the decoder based on the loss metric includes fine-tuning the decoder of the sequence transduction model based on the loss metric. In some implementations, a number of sequence pseudo-random encoder variables generated increases as a number of text labels in the training text sample increases.

In some examples, the operations further include generating, by a prediction network, a corresponding text label representation for each prior sequence of non-blank symbols output by a final softmax layer of the sequence transduction model. Processing the sequence of pseudo-random encoder variables may include processing the sequence of pseudo-random encoder variables and the corresponding text label representations to predict the probability distribution over the possible output labels. In some implementations, the decoder includes the prediction network and a joint network, the joint network configured to receive each corresponding text label representation generated by the prediction network and each pseudo-random encoder variable in the sequence of pseudo-random encoder variables. In some examples, training the decoder includes updating coefficients of the joint network, holding coefficients of the prediction network fixed, and holding coefficients of an encoder network of the sequence transduction model fixed. In some implementations, the prediction network includes a multi-headed attention mechanism, the multi-headed attention mechanism sharing a shared embedding matrix across each head of the multi-headed attention mechanism. The prediction network may tie a dimensionality of the shared embedding matrix to a dimensionality of an output layer of the joint network.

In some implementations, the sequence transduction model includes a recurrent neural network-transducer (RNN-T) based speech recognition model. In some examples, training the decoder includes training the decoder with hybrid autoregressive transducer factorization to integrate a language model of the sequence transduction model. The language model may include a neural network model having a stack of conformer layers or transformer layers.

Another aspect of the disclosure provides a system including data processing hardware, and memory hardware in communication with the data processing hardware and storing instructions that, when executed on the data processing hardware, causes the data processing hardware to perform operations. The operations include obtaining a training text sample, the training text sample not paired with corresponding audio data, and generating a sequence of pseudo-random encoder variables. The operations further include processing, using a decoder of a sequence transduction model, the sequence of pseudo-random encoder variables to predict a probability distribution over possible output labels, determining a loss metric based on the training text sample and the predicted probability distribution over possible output labels, and training the decoder based on the loss metric.

Implementations of the disclosure may include one or more of the following optional features. In some implementations, training the decoder based on the loss metric includes training the decoder based on a negative log of the probability distribution over possible output labels for the training text sample conditioned on the sequence of pseudo-random encoder variables. In some examples, the sequence transduction model is pre-trained on paired audio-text samples, and training the decoder based on the loss metric includes fine-tuning the decoder of the sequence transduction model based on the loss metric. In some implementations, a number of sequence pseudo-random encoder variables generated increases as a number of text labels in the training text sample increases.

In some examples, the operations further include generating, by a prediction network, a corresponding text label representation for each prior sequence of non-blank symbols output by a final softmax layer of the sequence transduction model. Processing the sequence of pseudo-random encoder variables may include processing the sequence of pseudo-random encoder variables and the corresponding text label representations to predict the probability distribution over the possible output labels. In some implementations, the decoder includes the prediction network and a joint network, the joint network configured to receive each corresponding text label representation generated by the prediction network and each pseudo-random encoder variable in the sequence of pseudo-random encoder variables. In some examples, training the decoder includes updating coefficients of the joint network, holding coefficients of the prediction network fixed, and holding coefficients of an encoder network of the sequence transduction model fixed. In some implementations, the prediction network includes a multi-headed attention mechanism, the multi-headed attention mechanism sharing a shared embedding matrix across each head of the multi-headed attention mechanism. The prediction network may tie a dimensionality of the shared embedding matrix to a dimensionality of an output layer of the joint network.

In some implementations, the sequence transduction model includes a recurrent neural network-transducer (RNN-T) based speech recognition model. In some examples, training the decoder includes training the decoder with hybrid autoregressive transducer factorization to integrate a language model of the sequence transduction model. The language model may include a neural network model having a stack of conformer layers or transformer layers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
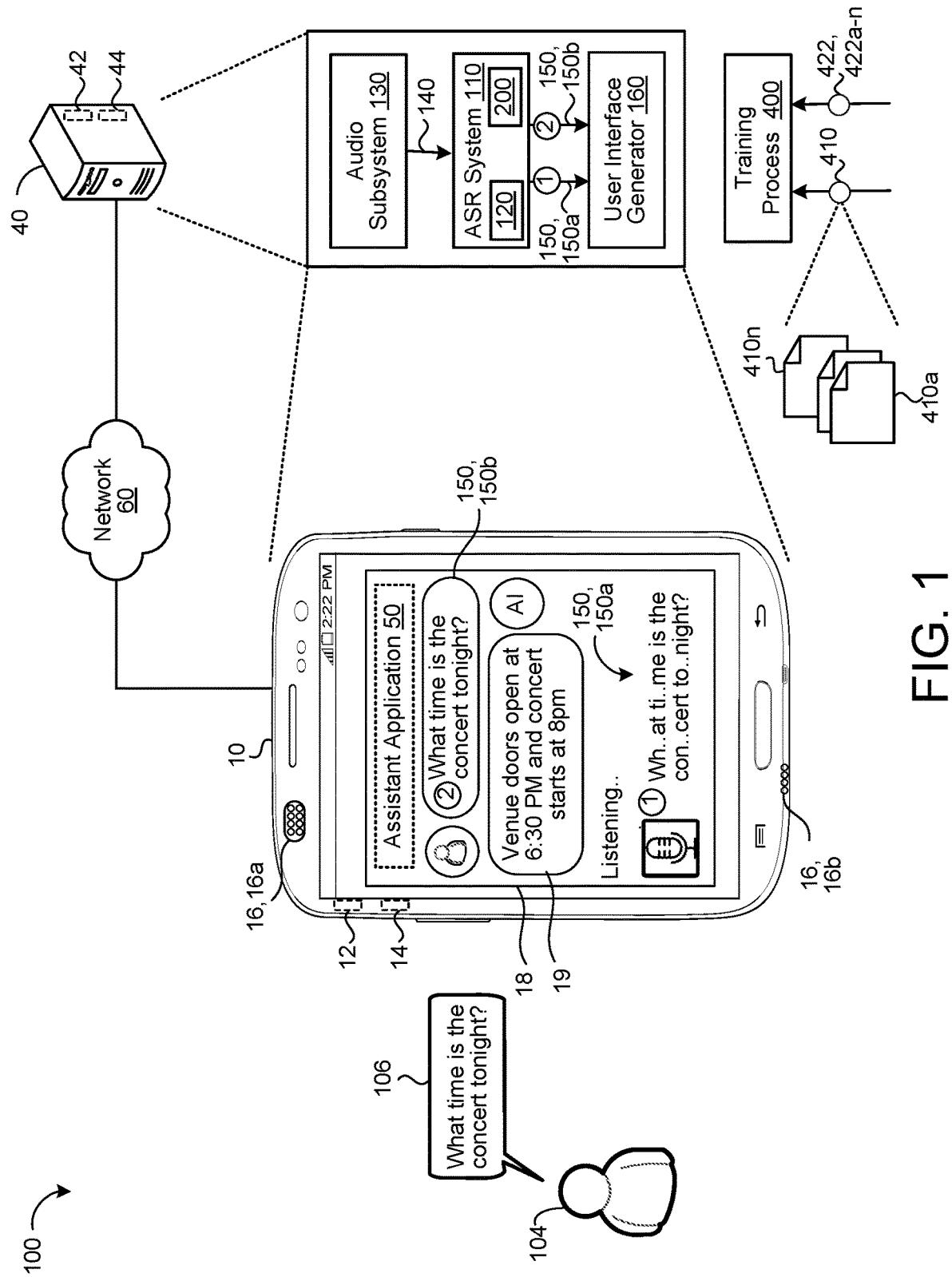
FIG. 1 is a schematic view of an example speech system using a recurrent neural network-transducer (RNN-T) model for transcribing speech.

Modern automatic speech recognition (ASR) systems include end-to-end (E2E) deep neural networks (e.g., a recurrent neural network-transducer (RNN-T) model) that are trained E2E using recorded human or synthesized speech paired with corresponding ground-truth text. Relative to previous training methods that individually train the separate components of an ASR model (e.g., an acoustic model, a pronunciation model, and a language model), E2E training has achieved superior speech recognition performance and resulted in more compact ASR models. Model compactness is especially important for ASR systems that run on mobile devices, which typically have more computational constraints. However, available large corpuses of transcribed audio available for training typically do not include the large number of existing rare words and proper names. Moreover, conventional ASR models often perform poorly for user-specific language biases and user-specific vocabularies. Accordingly, traditionally trained ASR models may not accurately recognize rare words, proper names, language biases, and user-specific vocabularies. Accuracy on rare words, proper names, language biases, and user-specific vocabulary is therefore an outstanding challenge for ASR systems.

While most ASR models are now typically trained E2E, their architectures still contain inherent components with distinct modalities. Here, the components include an audio encoder network, a text prediction network, and a joint network that combines outputs of the audio encoder network with outputs of the text prediction network to produce final wordpiece probabilities. Ideally, paired text and audio data is available for E2E training of all components together. However, in many instances, text-only data will be more readily available. Furthermore, during on-device personalization of an ASR model, often it is only the last few layers of the ASR model that are fine-tuned. Under this scenario, it has been advantageously discovered that it is possible to train the internal language model of an ASR model to learn new words based on training text samples, and hence improve overall speech recognition performance, without needing corresponding spoken or synthesized audio. Notably, in disclosed implementations, when training with training text samples for which no corresponding audio is available, outputs of an audio encoder network are replaced with a sequence of random encoder variables. Here, the random encoder variables may be a sequence of pseudo-random numbers that satisfy one or more statistical tests for randomness but are produced by a definite mathematical process. However, the random encoder variables may be generated using an actually random process, such as based on measured noise. For clarity of explanation, the following description refers to pseudo-random variables, but it should be understood that random variables may be used. The pseudo-random encoder variables stimulate the joint network while an inherent internal language model of the ASR model learns new words using a conventional loss function. In some examples, during personalization using pseudo-random encoder variables, the ASR model infers pronunciations for the new words. This approach allows the internal language model of the ASR model to learn new words (e.g., rare words, proper names, language biases, and vocabulary) from training text samples without requiring corresponding human or synthesized speech, or any new model components. It has been found that the resulting ASR model performs at least as well as when the ASR model is trained using synthesized speech (e.g., generated using a text-to-speech (TTS) engine), and hence disclosed implementations eliminate the need to run a potentially expensive on-device TTS engine during on-device personalization.

FIG. 1 is a schematic view of an example of a speech system 100. In the speech system 100, a user's 104 manner of interacting with a computing device, such as a user device 10, may be through voice input. The user device 10 (also referred to generally as device 10) is configured to capture sounds (e.g., streaming audio data) from one or more users 104 within the speech system 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 including an audio capture device (e.g., microphone) 16, 16a for capturing and converting spoken utterances 106 within the speech system 100 into electrical signals; and an audio output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more audio capture devices 16a in the array may not physically reside on the user device 10, but be in communication with the audio system 16. Moreover, while the user device 10 implements a single audio output device 16b in the example shown, the user device 10 may implement an array of audio output devices 16b without departing from the scope of the present disclosure, whereby one or more audio output devices 16b in the array may not physically reside on the user device 10, but be in communication with the audio system 16.

In the speech system 100, an automated speech recognition (ASR) system 110 implementing a sequence transduction model (e.g., a recurrent neural network-transducer (RNN-T) model 200) and an optional rescorer 120 resides on the user device 10 of the user 104 and/or on a remote system 40 (e.g., one or more remote servers of a distributed system executing in a cloud-computing environment) in communication with the user device 10 via a network 60. In some examples, the RNN-T model 200 is pre-trained on paired audio-text samples. The user device 10 and/or the remote system 40 also includes an audio subsystem 130 configured to receive the utterance 106 spoken by the user 104 and captured by the audio capture device 16a, and convert the utterance 106 into a corresponding digital format associated with input acoustic frames 140 capable of being processed by the ASR system 110. In the example shown, the user 104 speaks a respective utterance 106 and the audio subsystem 130 converts the utterance 106 into corresponding audio data (e.g., acoustic frames) 140 for input to the ASR system 110. Thereafter, the RNN-T model 200 receives, as input, the audio data 140 corresponding to the utterance 106, and generates/predicts, as output, a corresponding transcription 150 (e.g., recognition result/hypothesis) of the utterance 106. In the example shown, the RNN-T model 200 may perform streaming speech recognition to produce an initial speech recognition result 150, 150a, and the rescorer 120 may update (i.e., rescore) the initial speech recognition result 150a to produce a final speech recognition result 150, 150b. The remote system 40 includes data processing hardware 42, and memory hardware 44 in communication with the data processing hardware 42. The memory hardware 44 stores instructions that, when executed by the data processing hardware 42, cause the data processing hardware 42 to perform one or more operations, such as those disclosed herein.

The user device 10 and/or the remote system 40 also executes a user interface generator 160 configured to present a representation of the transcription 150 of the utterance 106 to the user 104 of the user device 10. As described in greater detail below, the user interface generator 160 may display the initial speech recognition results 150a in a streaming fashion during time 1, and subsequently display the final speech recognition result 150b during time 2. In some configurations, the transcription 150 output from the ASR system 110 is processed, e.g., by a natural language processing/understanding (NLP/NLU) module executing on the user device 10 or the remote system 40, to execute a user command/query specified by the utterance 106. Additionally or alternatively, a text-to-speech (TTS) system (not shown for clarity of illustration) (e.g., executing on any combination of the user device 10 or the remote system 40) may convert the transcription 150 into synthesized speech for audible output by the user device 10 (e.g., using the audio output device 16b) and/or another device.

In the example shown, the user 104 interacts with a program or digital assistant application 50 (e.g., a digital assistant application 50) executing on the user device 10 that uses the ASR system 110. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 140 for input to the ASR system 110.

Continuing with the example, the RNN-T model 200, while receiving the acoustic frames 140 corresponding to the utterance 106 as the user 104 speaks, encodes the acoustic frames 140 and then decodes the encoded acoustic frames 140 into the initial speech recognition results 150a. During time 1, the user interface generator 160 presents, via the digital assistant interface 18, a representation of the initial speech recognition results 150a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 160 presents, via the digital assistant interface 18, a representation of the final speech recognition result 150b of the utterance 106 to the user 104 of the user device 10 rescored by the rescorer 120. In some implementations, the user interface generator 160 replaces the representation of the initial speech recognition results 150a presented at time 1 with the representation of the final speech recognition result 150b presented at time 2. Here, time 1 and time 2 may include timestamps corresponding to when the user interface generator 160 presents the respective speech recognition result 150. In this example, the timestamp of time 1 indicates that the user interface generator 160 presents the initial speech recognition result 150a at an earlier time than the final speech recognition result 150b. For instance, because the final speech recognition result 150b is presumed to be more accurate than the initial speech recognition results 150a, the user interface generator 160 will ultimately display the final speech recognition result 150b as the transcription 150 to fix any terms that may have been misrecognized in the initial speech recognition results 150a. In this example, the streaming initial speech recognition results 150a output by the RNN-T model 200 are displayed on the screen of the user device 10 at time 1 are associated with low latency and provide responsiveness to the user 104 that his/her query is being processed, while the final speech recognition result 150b output by the rescorer 120 and displayed on the screen at time 2 leverages an additional speech recognition model and/or a language model to improve the speech recognition quality in terms of accuracy, but at increased latency. However, because the initial speech recognition results 150a are displayed as the user speaks the utterance 106, the higher latency associated with producing, and ultimately displaying the final recognition result 150b is not noticeable to the user 104.

In the example shown in FIG. 1, the digital assistant application 50 may respond to the question posed by the user 104 using NLP/NLU. NLP generally refers to a process of interpreting written language (e.g., the initial speech recognition results 150a and/or the final speech recognition result 150b) and determining whether the written language prompts any action. In this example, the digital assistant application 50 uses NLP/NLU to recognize that the question from the user 104 regards the user's schedule and more particularly a concert on the user's schedule. By recognizing these details with NLP/NLU, the automated assistant returns a response 19 to the user's query where the response 19 states, "Venue doors open at 7:30 PM and concert starts at 9 pm." In some configurations, NLP/NLU occurs on the remote system 40 in communication with the data processing hardware 12 of the user device 10.

Figure 2:
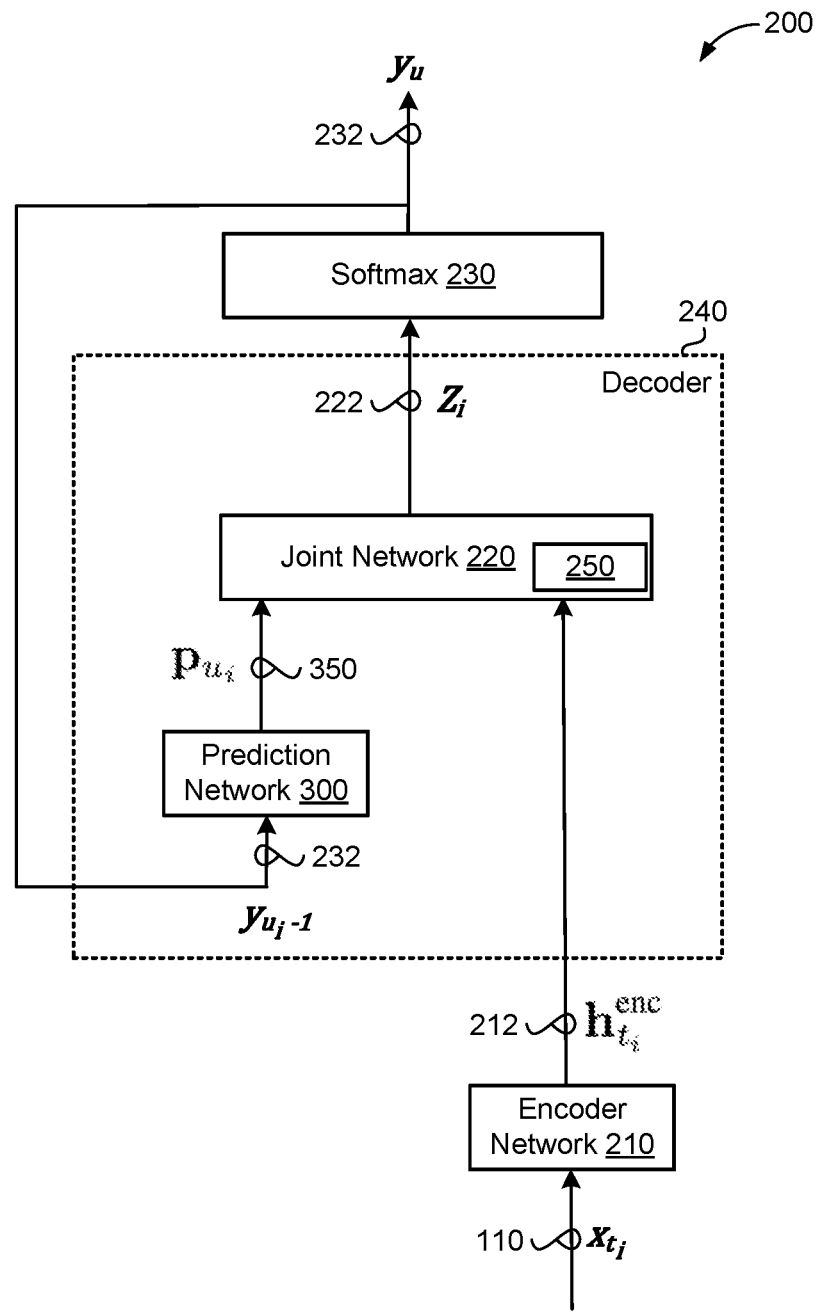
FIG. 2 is a schematic view of an example RNN-T model architecture.

FIG. 2 is a schematic view of an example recurrent neural network-transducer model 200 (i.e., RNN-T model 200) that may be personalized using training text samples to improve, during inference, speech recognition for rare words, proper names, user-specific vocabularies, language biases, etc. The RNN-T model 200 provides a small computational footprint and utilizes less memory requirements than conventional ASR architectures, making the RNN-T model 200 suitable for performing speech recognition entirely on the user device 10 (e.g., no communication with a remote server is required).

As shown, the RNN-T model 200 includes an RNN-T encoder 210, a prediction network 300, a joint network 220, and a final softmax layer 230. The prediction network 300 and the joint network 300 may collectively provide an RNN-T decoder 240. In the example shown, the joint network 220 implements an inherent internal language model 250 of the RNN-T model 200. In some examples, the inherent internal language model 250 includes a multilingual language model.

The encoder network 210, which is roughly analogous to an acoustic model (AM) in a traditional ASR system, may include a recurrent network of stacked Long Short-Term Memory (LSTM) layers. For instance, the encoder 210 reads a sequence of d-dimensional feature vectors (e.g., acoustic frames 140 (FIG. 1)) $x=(x_1, x_2, \ldots, x_T)$, where $x_t \in \mathbb{R}^d$, and produces at each time step a higher-order feature representation 212. This higher-order feature representation 212 is denoted as $h^{enc}=h_1^{enc}, \ldots, h_T^{enc}$.

Similarly, the prediction network 300 may include an LSTM network, which, like a language model, processes the sequence of non-blank symbols 232 output by the final softmax layer 230 so far, $y_0, \ldots, y_{ui-1}$, into a dense or hidden representation $p_{u_i}$ 350. Described in greater detail below, the representation $p_{u_i}$ 350 includes a single embedding vector. Notably, the sequence of non-blank symbols 232 received at the prediction network 300 capture linguistic dependencies between non-blank symbols 232 predicted during the previous time steps so far to assist the joint network 220 in predicting the probability of a next output symbol or blank symbol during the current time step. As described in greater detail below, to contribute to techniques for reducing the size of the prediction network 300 without sacrificing accuracy/performance of the RNN-T model 200, the prediction network 300 may receive a limited-history sequence of non-blank symbols 232 $y_{ui-n}, \ldots, y_{ui-1}$ that is limited to the N previous non-blank symbols 232 output by the final softmax layer 230.

The joint network 220 combines the higher-order feature representation $h_{t_i}^{enc}$ 212 produced by the encoder network 210 and the representation $p_{u_i}$ 350 (i.e., single embedding vector 350) produced by the prediction network 300. The joint network 220 predicts a probability distribution $Z_i = P(y_i | x_{t_i}, y_0, \ldots, y_{u_{i-1}})$ 222 over the next output symbol. Stated differently, the joint network 220 generates, at each time step, a probability distribution $Z_i$ 222 over possible speech recognition hypotheses. Here, the "possible speech recognition hypotheses" correspond to a set of possible output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 220 may output a set of values indicative of the likelihood of occurrence of each of a predetermined set of output labels. This set of values can be a vector and can indicate a probability distribution $Z_i$ 220 over the set of possible output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The probability distribution $Z_i$ 222 output by the joint network 220 can include an a posteriori probability value for each of the different possible output labels. Thus, if there are 100 different possible output labels representing different graphemes or other symbols, the probability distribution $Z_i$ 222 output by the joint network 220 can include 100 different probability values, one for each possible output label. The probability distribution $Z_i$ 222 can then be used to select and assign scores to candidate orthographic elements (e.g., graphemes, wordpieces, and/or words) in a beam search process (e.g., by the softmax layer 230) for determining the transcription 150.

The final softmax layer 230 receives the probability distribution $Z_i$ 222 for the final speech recognition result 150b and selects the output label/symbol $y_u$ 232 with the highest probability to produce the transcription 150. The final softmax layer 230 may employ any technique to select the output label/symbol $y_u$ 232 with the highest probability in the distribution $Z_i$ 232. In this manner, the RNN-T model 200 does not make a conditional independence assumption, rather the prediction of each symbol $y_u$ 232 is conditioned not only on the acoustics but also on the sequence of past non-blank labels 232 $y_{ui-n}, \ldots, y_{ui-1}$ output so far by the softmax layer 230. In some examples, the RNN-T model 200 assumes an output symbol 232 is independent of future acoustic frames 140, which allows the RNN-T model 200 to be employed in a streaming fashion.

The final speech recognition result 150b is presumed to be more accurate than the initial speech recognition result 150a because the RNN-T model 200 determines the initial speech recognition results 150a in a streaming fashion and the final speech recognition results 150b using the prior non-blank symbols $y_u$ 232 from the initial speech recognition result 150a. That is, the final speech recognition results 150b take into account the prior non-blank symbols $y_u$ 232 and, thus, are presumed to be more accurate because the initial speech recognition results 150a do not take into account any prior non-blank symbols $y_u$ 232. Moreover, the rescorer 120 (FIG. 1) may update the initial speech recognition result 150a with the final speech recognition result 150b to provide the transcription 150 via the user interface generator 170 to the user 104.

Figure 3:
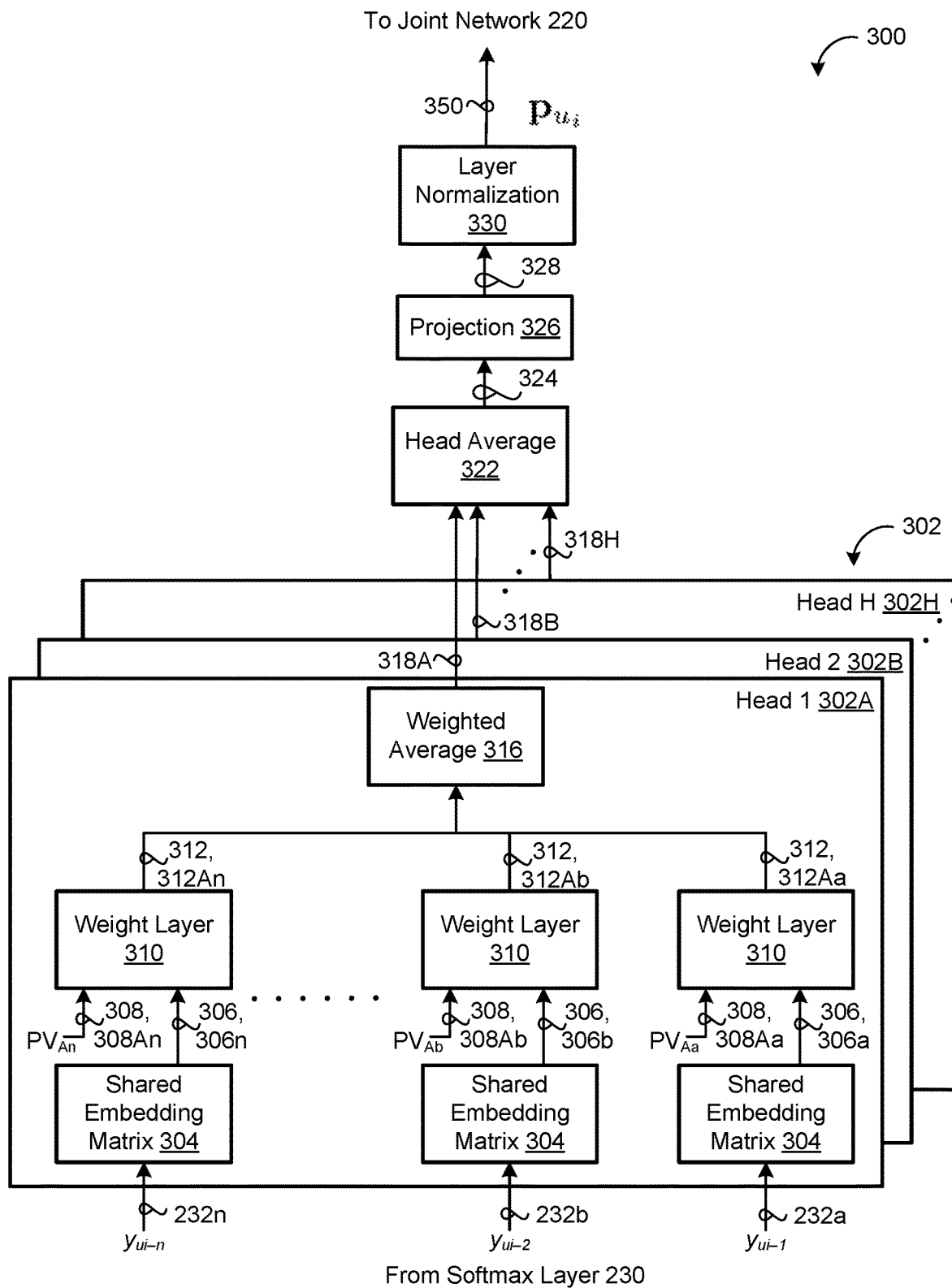
FIG. 3 is a schematic view of an example prediction network architecture.

FIG. 3 is a schematic view of an example prediction network 300 for the RNN-T model 200. The prediction network 300 receives, as input, a sequence of non-blank symbols 232a-n $y_{ui-n}$, ..., $y_{ui-1}$ that is limited to the N previous non-blank symbols 232a-n output by the final softmax layer 230. In some examples, N is equal to two. In other examples, N is equal to five, however, the disclosure is non-limiting and N may equal any integer. The sequence of non-blank symbols 232a-n indicates an initial speech recognition result 150a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., X∈ $\mathbb{R}^{N \times d_e}$) for each non-blank symbol among the sequence of non-blank symbols 232a-n $y_{ui-n}$, ..., $y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., P∈ $\mathbb{R}^{H \times N \times d_e}$) to each corresponding non-blank symbol in the sequence of non-blank symbols 232a-n $y_{ui-n}$, ..., $y_{ui-1}$. The respective position vector PV 308 assigned to each non-blank symbol indicates a position in the history of the sequence of non-blank symbols (e.g., the N previous non-blank symbols 232a-n output by the final softmax layer 230). For instance, the first position vector $PV_{Aa}$ is assigned to a most recent position in the history, while the last position vector $PV_{An}$ is assigned to a last position in the history of the N previous non-blank symbols output by the final softmax layer 230. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 232a-n $y_{ui-n}$, ..., $y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302 H defines another different row of position vectors $PV_{Ha-Hn}$ 308$_{Ha-Hn}$.

For each non-blank symbol in the sequence of non-blank symbols 232a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_{e} (X_{n,e} * P_{h,n,e}) \quad (1)$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa- An is simply passed through the projection layer 326 and layer normalization 330 to provide the single embedding vector $p_{u_i}$ 350.

In some implementations, to further reduce the size of the RNN-T decoder, i.e., the prediction network 300 and the joint network 220, parameter tying between the prediction network 300 and the joint network 220 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 220, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 220 includes a weight matrix $[d_h, |V|]$. By having the prediction network 300 to tie the size of the embedding dimension $d_e$ to the dimensionality $d_h$ of the last hidden layer of the joint network 220, the feed-forward projection weights of the joint network 220 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size |V|. This weight tying corresponds to a regularization technique.

Figure 4:
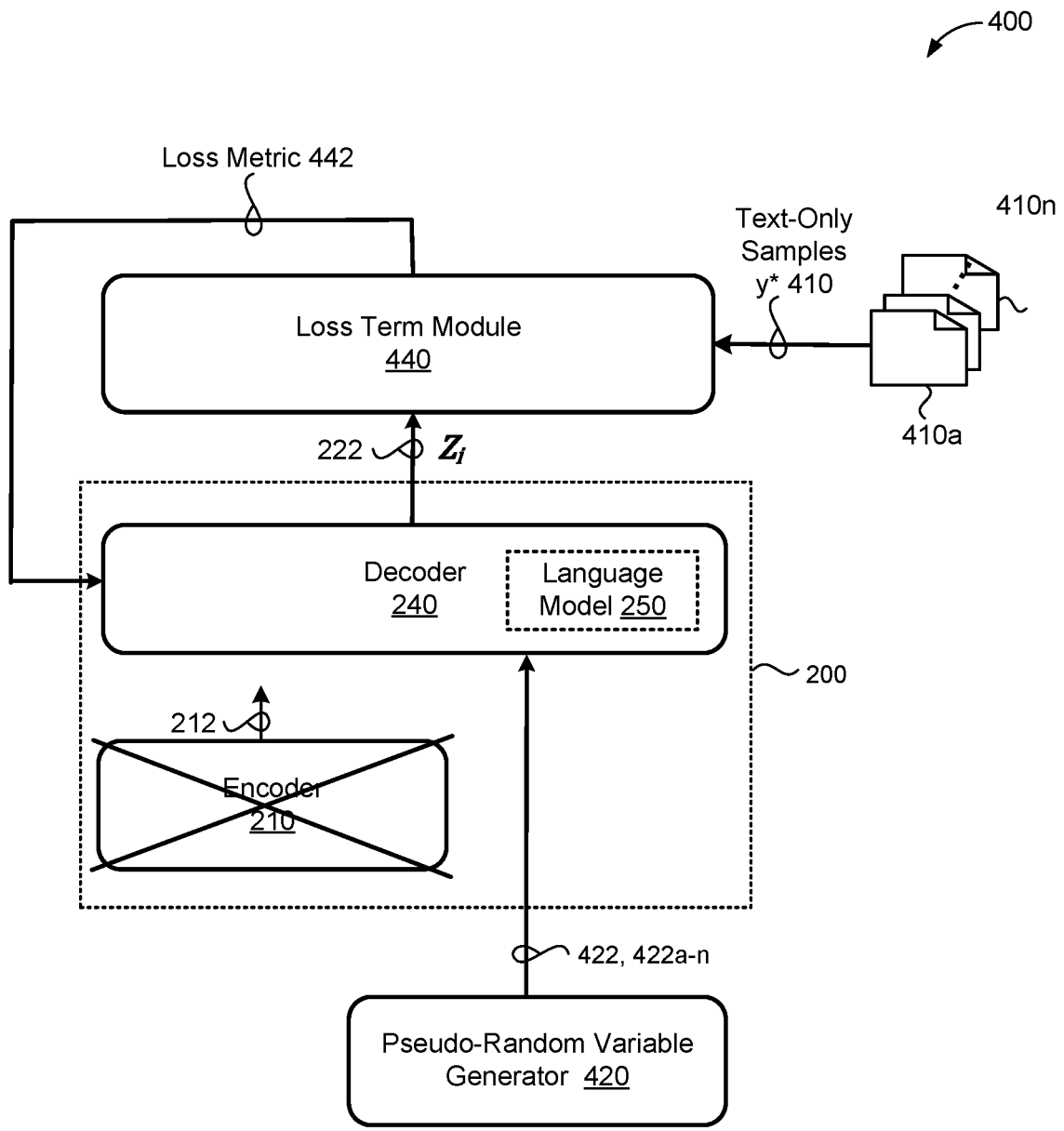
FIG. 4 is a schematic view of an example training process for training a language model of an automatic speech recognition (ASR) model using random encoder variables.

Referring back to FIG. 1, a training process 400 personalizes the internal language model 250 of the RNN-T model 200 based on one or more training text samples y* 410, 410a-n (e.g., text-only training samples that include text without any corresponding spoken or synthesized speech) by using a sequence of pseudo-random encoder variables 422, 422a-n generated by a pseudo-random variable generator 420 (FIG. 4). Notably, the training process 400 uses the sequence of pseudo-random encoder variables 422 instead of outputs 212 corresponding to encodings of acoustic frames output by the encoder 210 (see FIG. 4). The sequence of pseudo-random encoder variables 422 stimulates the joint network 220 while teaching the inherent internal language model 250 of the RNN-T model 200 to learn new words using a conventional loss function.

In some examples, the training process 400 (or a separate training sample generator, which is not shown for clarity of illustration) generates the training text samples y* 410 based on, for example, words entered (e.g., typed) by the user 104 of the device 10, transcription corrections made by the user 104, web pages viewed by the user 104 using the device 10, documents stored on the device 10 or a server (not shown for clarity of illustration) to which the user device 10 is communicatively coupled, a contact list stored on the user device 10 or a server (not shown for clarity of illustration) to which the user device 10 is communicatively coupled, and a public database containing rare words or proper names. However, the training process 400 may obtain text for the training text samples y* 410 for any particular domain using additional or alternative techniques. In some examples, the training process 400 identifies text for the training text samples y* 410 to be words that occur less than five times in a large corpus of paired audio and training text samples, or words having surprising pronunciations given their spellings.

In some examples, when a user corrects a mistranscription 150 of one or more spoken words (e.g., a mistranscription of an utterance of "Who is Khe Chai" as "Who is kitchen"), the training process 400 personalizes the RNN-T model 200 with a training text sample y* 410 that includes the corrected transcription 150 (e.g., "Who is Khe Chai"). However, when a user repeatedly corrects such a mistranscription, the training process 400 may repeatedly train the RNN-T model 200 with the same training sample y* 410. Such repeated training by the training process 400 may cause the RNN-T model 200 to overlearn the corrected word(s) (e.g., "Khe Chai"), such that the RNN-T model 200 forgets words of the initial transcription 150 (e.g., "kitchen") as an unintended consequence. Accordingly, the training process 400 may personalize the language model 250 of the RNN-T model 200 using anti-context training text samples y* 410 that include the misrecognized words (e.g., "Who is in the kitchen") to help reduce the likelihood that the RNN-T model 200 will mistranscribe future utterances spoken by the user that actually contain the misrecognized phrase (e.g., the user actual speaks "kitchen"). In some examples, the training process 400 generates anti-context training text sample y* 410 to include a phrase that includes the misrecognized word(s) (e.g., "Sally is in the kitchen").

While, for clarity of explanation, the following describes personalizing a pre-trained sequence transduction model based on training text samples y* 410 and a sequence of pseudo-random encoder variables 422, one of ordinary skill in the art will recognize that disclosed implementations may also be used to initially train an ASR model on training text samples 410 for which no paired audio data is available. Similarly, implementations herein are similarly applicable to training an external language model separate from the ASR model that may be used, for instance, for rescoring speech recognition hypotheses predicted by the ASR model. Moreover, disclosed implementations may also be used to update or train a global ASR model (e.g., an ASR model trained for execution on multiple user devices). For example, personalization techniques disclosed herein that leverage generating pseudo-random variables 422 in place of audio encodings of acoustic frames may be used with federated learning to update or train a global ASR model. In some examples, the training process 400 also personalizes the RNN-T model 200 based on paired audio and training text samples using, for example, a conventional E2E RNN-T training process.

FIG. 4 is a schematic view of an example training process 400 for personalizing a language model of an ASR model 200 to learn words contained in the one or more training text samples y* 410. Notably, the training text samples y* 410 are not paired with any corresponding audio data. Nor does the training process 400 generate or obtain any corresponding audio data for the training text samples y* 410. The training process 400 personalizes the ASR model 200 by minimizing a loss metric 442 on the training text samples y* 410. An example loss metric 442 includes a log loss metric. The speech recognition model 200 may include the RNN-T model architecture of FIG. 2 that includes the encoder 210 and the decoder 240, wherein the decoder 240 collectively includes the prediction network 300 and the joint network 220 and implements the inherent internal language model 250. The training process 400 may execute on the remote system 40 (i.e., on the memory hardware 12).

For each training sample y* 410 of the one or more trainings samples y* 410, the training process 400 processes, using the decoder 240 of the RNN-T model 200, a sequence of pseudo-random encoder variables 422 generated by the pseudo-random variable generator 420 to generate a probability distribution 222 over one or more possible output labels for the training text sample y* 410. Notably, as shown in FIG. 4, the decoder 240 processes the sequence of pseudo-random encoder variables 422 generated by the pseudo-random variable generator 420 in lieu of audio encoding outputs 212 from the encoder 210 since no audio samples are available for the training text samples 410, or otherwise input to the encoder. Because the pseudo-random encoder variables 422 are random, the pseudo-random encoder variables 422 do not encode past temporal information (e.g., past audio inputs), and the training process 400 effectively optimizes the prior probabilities of the joint network 240 of the RNN-T model 200 as learned by the internal language model 250.

The pseudo-random variable generator 420 executes one or more definite mathematical processes (e.g., a deterministic and repeatable process based on seed variable) that generate the sequence of pseudo-random encoder variables 422 to be a sequence of pseudo-random numbers that satisfy one or more statistical tests for randomness. For clarity of explanation, the present disclosure refers to pseudo-random variables, but it should be understood that actually random variables may be used. Here, the pseudo-random variable generator 420 may generate the random encoder variables using an actually random process, such as based on measured noise. In some implementations, the pseudo-random variable generator 420 generates the pseudo-random encoder variables 422 to approximate a zero-mean Gaussian or normal distribution. Alternatively, the pseudo-random variable generator 420 generates the pseudo-random encoder variables 422 to approximate a zero-mean uniform distribution. In some implementations, the pseudo-random variable generator 420 selects the number of pseudo-random encoder variables 422 in a sequence of pseudo-random encoder variables 422 for a particular training text sample y* 410 based on the number of text labels associated with the training text sample y* 410. For example, four pseudo-random encoder variables 422 per text label. In some examples, the number of pseudo-random encoder variables 422 in a sequence of pseudo-random encoder variables 422 for a particular training text sample y* 410 increases as the number of text labels associated with the training text sample y* 410 increases.

Thereafter, for each training text sample y* 410, a loss term module 440 receives a probability distribution $Z_i$ 222 over respective possible output labels (e.g., recognition hypotheses) output by the RNN-T model 200 for the training text sample y* 410, and determines a loss metric 442 based on the probability $Z_i$ 222 for the output label(s) that matches the text of the training text sample y* 410. For a particular training text sample y* 410, an example loss metric 442 is a log loss metric $\mathcal{L}_{ll}$ 442 based on the negative of the log of the probability $Z_i$ 222 conditioned on the sequence of pseudo-random encoder variables 422, which may be expressed as follows.

$$\mathcal{L}_{ll} = -\log Pr(y^* | x) \quad (2)$$

where Pr(y*|x) is the probability $Z_i$ 222 for the possible output label(s) corresponding to the text of the training text sample y* 410. By reducing this log loss metric $\mathcal{L}_{ll}$ 442, the training process 400 personalizes the internal language model 250 of the RNN-T model 200 to increase the probability $Z_i$ 222 for the corresponding text (e.g., word(s)) of the training text sample y* 410. That is, the training processes teaches the joint network 240 implementing the internal language model 250 to learn the corresponding text of the training text sample y* 410 without using any corresponding audio samples.

In some examples, the training process 400 uses hybrid autoregressive transducer (HAT) factorization to factor out an internal language model score pilm(y) of the RNN-T model 200 so that an effective score of the RNN-T model 200 can be represented as follows.

$$\log p(x | y) \approx \log p(y | x) - \log pilm(y) \quad (3)$$

HAT factorization enables the training process 400 to better integrate the internal language model 250 without requiring coverage penalties as follows.

$$y = \operatorname{argmax}_y [\lambda_1 \log p(y | x) - \lambda_2 \log pilm(y) + \log plm(y)] \quad (4)$$

where $\lambda_1$ and $\lambda_2$ denote weights assigned to the encoder 210 and the internal language model 250, respectively.

Based on the loss metric 442 output by the loss term module 550 for each training sample y* 410, the training process 400 personalizes the RNN-T model 200 to minimize the loss metric 442. In some examples, the training process 400 personalizes the RNN-T model 200 by training the joint network 220 (e.g., updating or fine-tuning coefficients of the joint network 220) while holding the prediction network 300 fixed (e.g., holding coefficients of the prediction network 300 fixed) and also holding the encoder network 210 fixed (e.g., holding coefficients of the encoder network 210 fixed).

Figure 5:
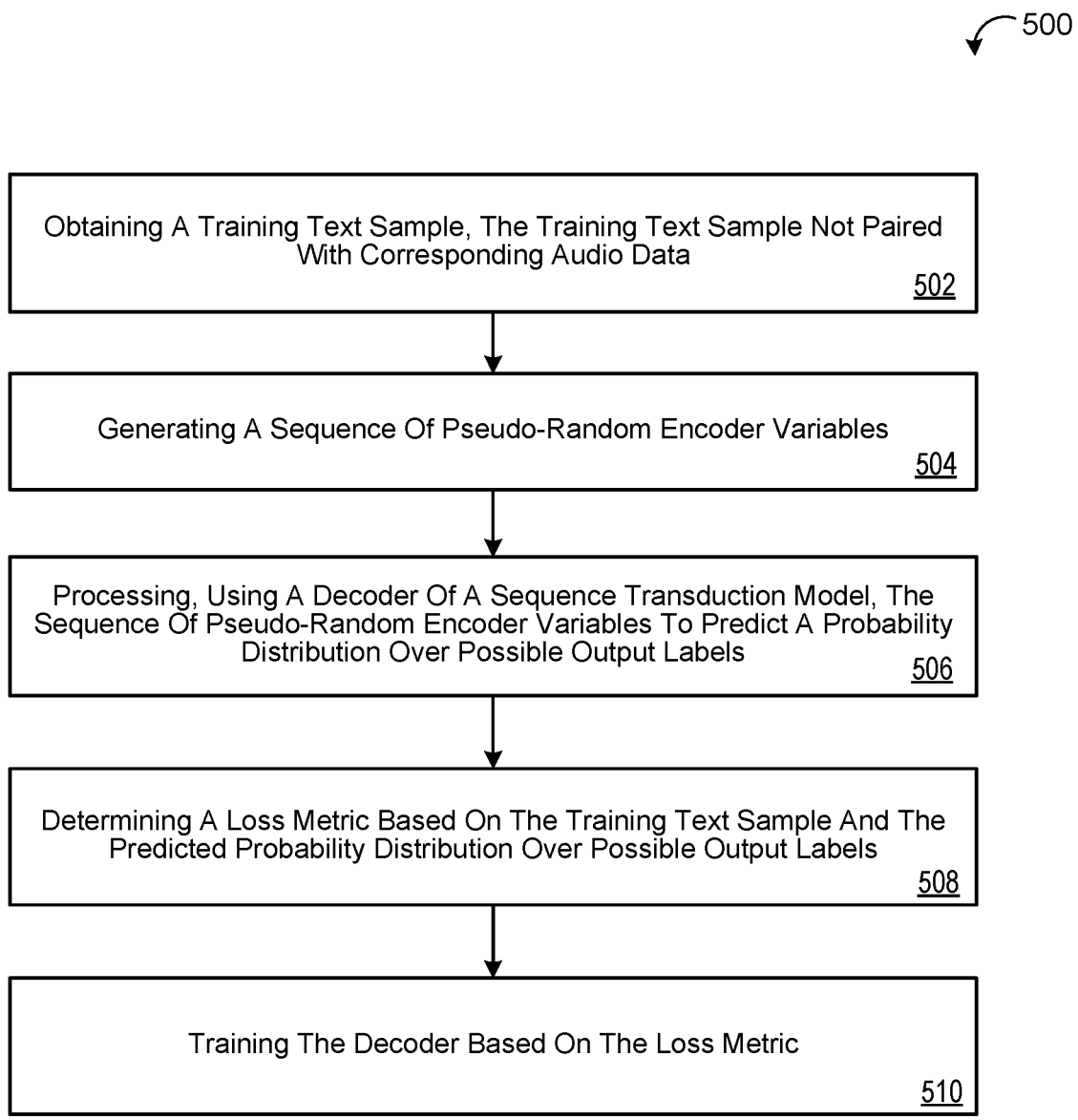
FIG. 5 is a flowchart of an example arrangement of operations for a computer-implemented method of training a language model of an ASR model using random encoder variables.

FIG. 5 is a flowchart of an exemplary arrangement of operations for a computer-implemented method 500 for training a language model of a speech recognition model (e.g., the language model 250 of the RNN-T model 200) using random encoder variables. At operation 502, the method 500 includes obtaining a training text sample y* 410, the training text sample y* 410 not paired with any corresponding audio data. Notably, the method 500 does not generate or obtain any corresponding audio data for the training text sample y* 410. At operation 504, the method 500 includes generating a sequence of pseudo-random encoder variables 422.

The method 500 includes, at operation 506, processing, using a decoder 240 of a sequence transduction model 200 (e.g., the RNN-T model 200), the sequence of pseudo-random encoder variables 422 to predict a probability distribution 222 over possible output labels. At operation 508, the method 500 includes determining a loss metric 442 based on the training text sample y* 410 and the predicted probability distribution 222 over possible output labels. The method 500, at operation 510, includes training the decoder 240 based on the loss metric 442.

Figure 6:
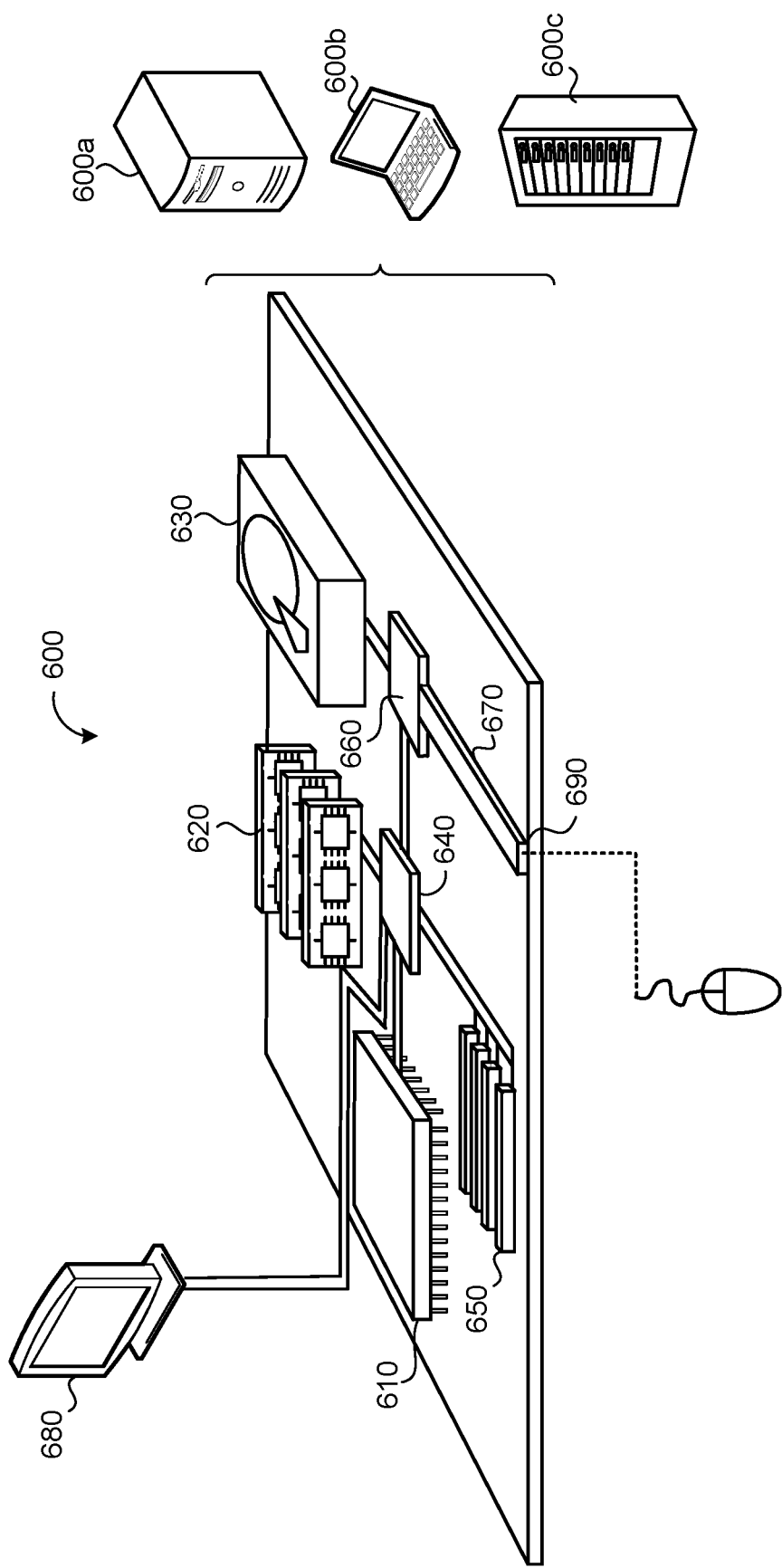
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (i.e., data processing hardware) that can be used to implement the data processing hardware 12 and/or 42, memory 620 (i.e., memory hardware) that can be used to implement the memory hardware 14 and/or 44, a storage device 630 (i.e., memory hardware) that can be used to implement the memory hardware 14 and/or 44, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
    obtaining a training text sample, the training text sample not paired with corresponding audio data;
    generating, using a pseudo-random variable generator, a sequence of pseudo-random encoder variables for the training text sample that is not paired with corresponding audio data;
    processing, using a decoder of a sequence transduction model, the sequence of pseudo-random encoder variables generated for the training text sample that is not paired with corresponding audio data to predict a probability distribution over possible output labels;
    determining a loss metric based on the training text sample and the predicted probability distribution over possible output labels; and
    training, based on the loss metric, the decoder with hybrid autoregressive transducer factorization to integrate a language model of the sequence transduction model,
    wherein the language model comprises a neural network model comprising a stack of conformer layers or transformer layers.

2. The computer-implemented method of claim 1, wherein training the decoder based on the loss metric comprises training the decoder based on a negative log of the probability distribution over possible output labels for the training text sample conditioned on the sequence of pseudo-random encoder variables.

3. The computer-implemented method of claim 1, wherein:
    the sequence transduction model is pre-trained on paired audio-text samples; and
    training the decoder based on the loss metric comprises fine-tuning the decoder of the sequence transduction model based on the loss metric.

4. The computer-implemented method of claim 1, wherein a number of sequence pseudo-random encoder variables generated increases as a number of text labels in the training text sample increases.

5. A computer-implemented method executed on data processing hardware that causes the data processing hardware to perform operations comprising:
    obtaining a training text sample, the training text sample not paired with corresponding audio data;
    generating a sequence of pseudo-random encoder variables;
    generating, by a prediction network, a corresponding text label representation for each prior sequence of non-blank symbols output by a final softmax layer of the sequence transduction model;
    processing, using a decoder of the sequence transduction model, the sequence of pseudo-random encoder variables and the corresponding text label representations to predict a probability distribution over possible output labels;
    determining a loss metric based on the training text sample and the predicted probability distribution over possible output labels; and
    training the decoder based on the loss metric.

6. The computer-implemented method of claim 5, wherein the decoder comprises the prediction network and a joint network, the joint network configured to receive each corresponding text label representation generated by the prediction network and each pseudo-random encoder variable in the sequence of pseudo-random encoder variables.

7. The computer-implemented method of claim 6, wherein training the decoder comprises:
    updating coefficients of the joint network;
    holding coefficients of the prediction network fixed; and
    holding coefficients of an encoder network of the sequence transduction model fixed.

8. The computer-implemented method of claim 6, wherein the prediction network comprises a multi-headed attention mechanism, the multi-headed attention mechanism sharing a shared embedding matrix across each head of the multi-headed attention mechanism.

9. The computer-implemented method of claim 8, wherein the prediction network ties a dimensionality of the shared embedding matrix to a dimensionality of an output layer of the joint network.

10. The computer-implemented method of claim 1, wherein the sequence transduction model comprises a recurrent neural network-transducer (RNN-T) based speech recognition model.

11. A system comprising:
data processing hardware; and
memory hardware in communication with the data processing hardware and storing instructions that when executed on the data processing hardware causes the data processing hardware to perform operations comprising:
   obtaining a training text sample, the training text sample not paired with corresponding audio data;
   generating, using a pseudo-random variable generator, a sequence of pseudo-random encoder variables for the training text sample that is not paired with corresponding audio data;
   processing, using a decoder of a sequence transduction model, the sequence of pseudo-random encoder variables generated for the training text sample that is not paired with corresponding audio data to predict a probability distribution over possible output labels;
   determining a loss metric based on the training text sample and the predicted probability distribution over possible output labels; and
   training, based on the loss metric, the decoder with hybrid autoregressive transducer factorization to integrate a language model of the sequence transduction model,
   wherein the language model comprises a neural network model comprising a stack of conformer layers or transformer layers.

12. The system of claim 11, wherein training the decoder based on the loss metric comprises training the decoder based on a negative log of the probability distribution over possible output labels for the training text sample conditioned on the sequence of pseudo-random encoder variables.

13. The system of claim 11, wherein:
the sequence transduction model is pre-trained on paired audio-text samples; and
training the decoder based on the loss metric comprises fine-tuning the decoder of the sequence transduction model based on the loss metric.

14. The system of claim 11, wherein a number of sequence pseudo-random encoder variables generated increases as a number of text labels in the training text sample increases.

15. A system comprising:
data processing hardware; and
memory hardware in communication with the data processing hardware and storing instructions that when executed on the data processing hardware causes the data processing hardware to perform operations comprising:
   obtaining a training text sample, the training text sample not paired with corresponding audio data;
   generating a sequence of pseudo-random encoder variables;
   generating, by a prediction network, a corresponding text label representation for each prior sequence of non-blank symbols output by a final softmax layer of the sequence transduction model;
   processing, using a decoder of the sequence transduction model, the sequence of pseudo-random encoder variables and the corresponding text label representations to predict a probability distribution over possible output labels;
   determining a loss metric based on the training text sample and the predicted probability distribution over possible output labels; and
   training the decoder based on the loss metric.

16. The system of claim 15, wherein the decoder comprises the prediction network and a joint network, the joint network configured to receive each corresponding text label representation generated by the prediction network and each pseudo-random encoder variable in the sequence of pseudo-random encoder variables.

17. The system of claim 16, wherein training the decoder comprises:
updating coefficients of the joint network;
holding coefficients of the prediction network fixed; and
holding coefficients of an encoder network of the sequence transduction model fixed.

18. The system of claim 16, wherein the prediction network comprises a multi-headed attention mechanism, the multi-headed attention mechanism sharing a shared embedding matrix across each head of the multi-headed attention mechanism.

19. The system of claim 18, wherein the prediction network ties a dimensionality of the shared embedding matrix to a dimensionality of an output layer of the joint network.

20. The system of claim 11, wherein the sequence transduction model comprises a recurrent neural network-transducer (RNN-T) based speech recognition model.

* * * * *